United States Patent Office 3,343,005
Patented Sept. 19, 1967

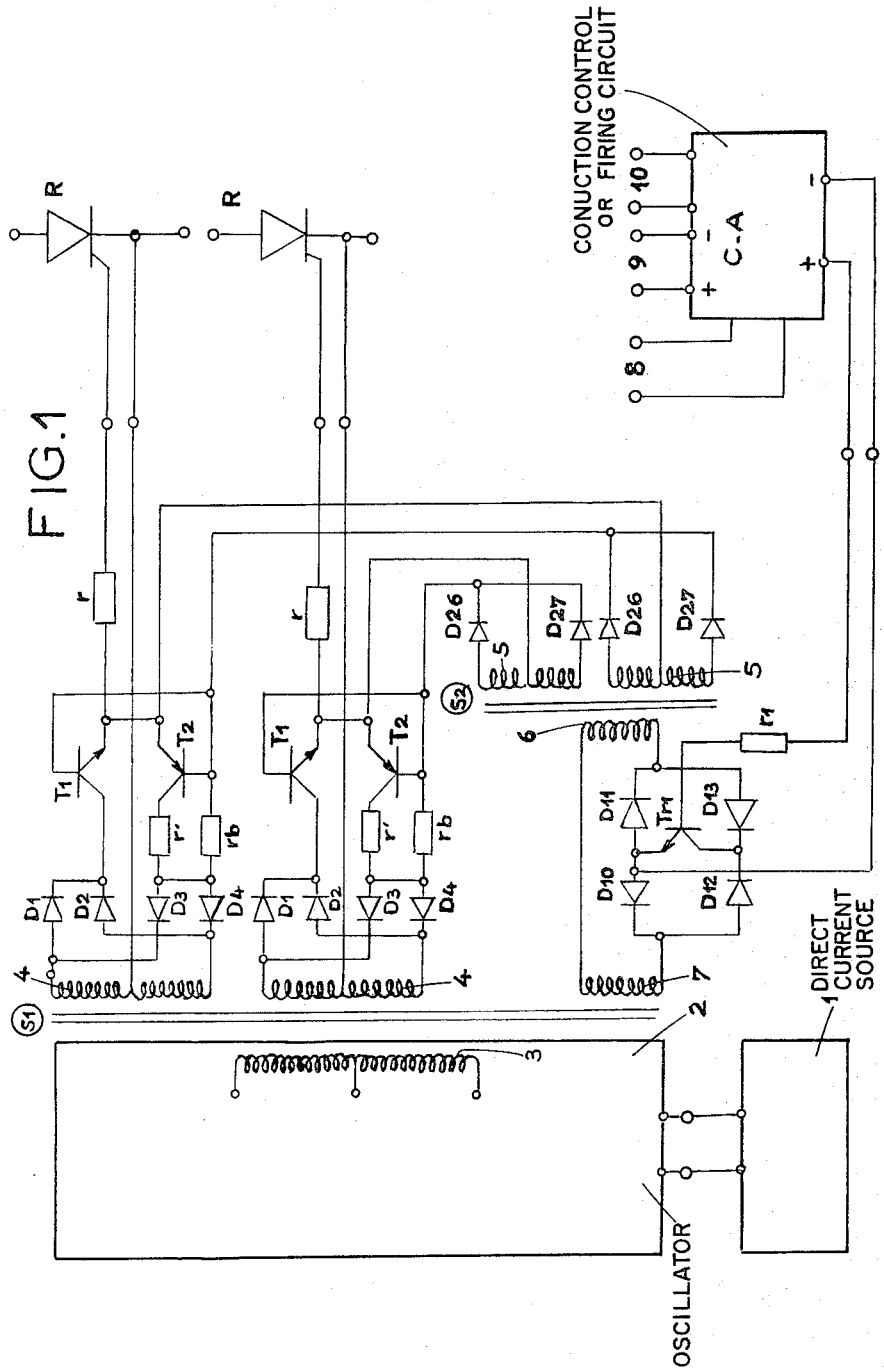

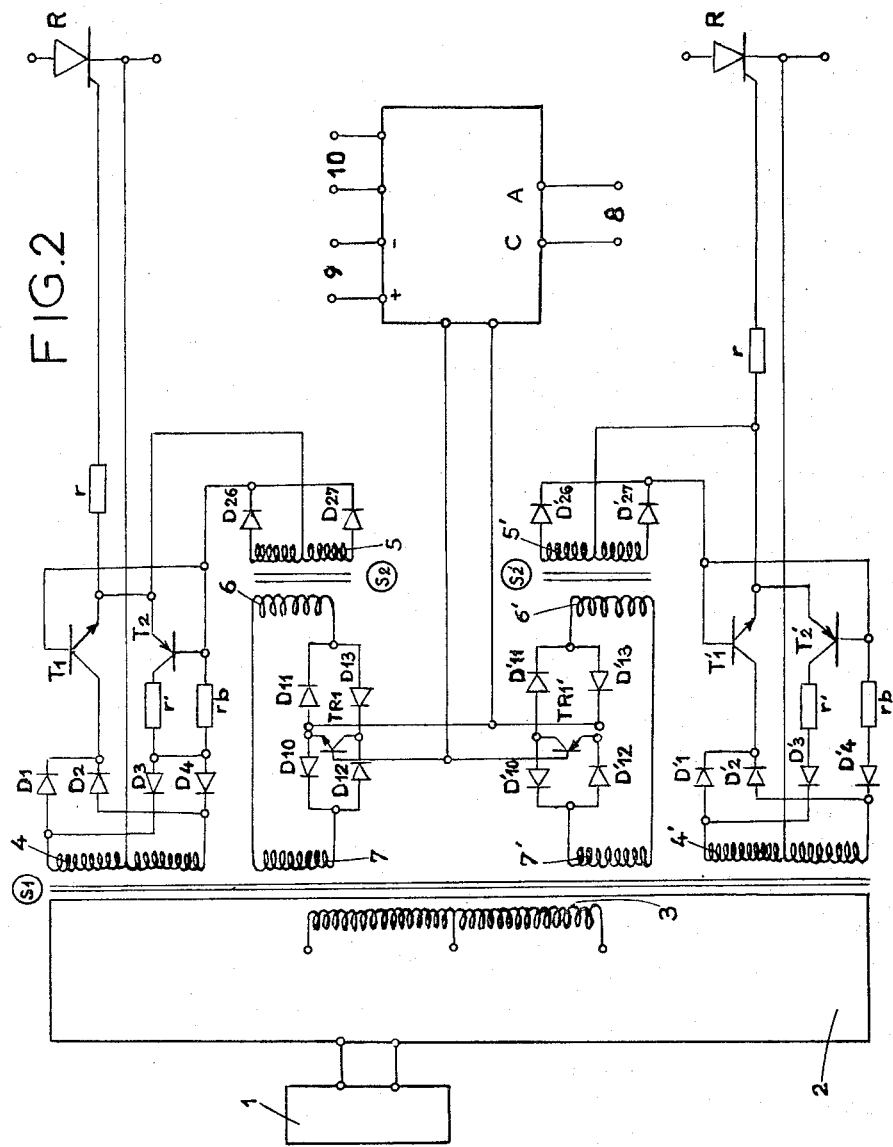

3,343,005
CONTROLLED RECTIFIER CONDUCTION CONTROL ARRANGEMENT
Robert Chauprade, Puteaux (Seine), France, assignor to La Materiel Electrique S.W., Paris, France, a company of France
Filed Feb. 8, 1965, Ser. No. 430,879
2 Claims. (Cl. 307—88.5)

The present invention relates to a controlled rectifier conduction control arrangement and in particular to the provision of pulse multiplier circuits, for the multiplication of conduction control impulses transmitted to gates situated in the grid circuits of controlled rectifiers, by a pulse circuit called a firing circuit.

The increase in applications of silicon controlled rectifiers is such that new requirements arise. As the member of the elements assembled in a "series parallel" groups of controlled rectifiers goes on increasing, the problem of multiplication of pulses generated by the same circuit arises, due regard being had to the electrical insulation necessary between the different grid circuits.

Our co-pending application Ser. No. 411,886, describes a device in which the conduction control signal and the conduction energy are separate, allowing distribution over a large number controlled rectifier grid circuits of a positive or negative signal, during fixed periods. This circuit allows grouping of the controlled rectifiers, rapidity of pulse establishment, and synchronism of pulses and favours the connection in series of controlled rectifiers without the addition of other devices such as the usual R.C. networks. This circuit also allows negative biasing of the grids of controlled rectifiers during their non-conductive period as well as making one or the other of two groups of rectifiers non-conductive, in the case of reversible circuits without current circulation. Further, the feeding of rectifier assemblies is possible by cancelling the firing pulses on the rectifier group which is to be made non-conductive and while maintaining for greater safety a negative bias on the grid circuit, these functions being ensured under the control of a logical instruction arising for example from an application of the brakes, a reversal of a direct or alternating current motor, or again the appearance of a momentary fault such as the return of the arc in the case of controlled rectifiers using ignitions for firing, or of a persistent fault in the case of burning-out of protective fuses for controlled rectifiers.

However, the above circuit uses pulse type firing circuits having only four electrically insulated outlets although it is necessary for various applications to multiply the conduction control signals when a firing circuit has to control more than four controlled rectifiers.

One known means which is usable to this end, is a pulse distributor transformer but its possibilities are limited as to the number of controlled rectifiers with which it can be used.

According to the invention there is provided a controlled rectifier conduction control arrangement comprising a source of conduction control signals connected to at least one bi-directional gate arranged to be fed by a secondary winding of a first transformer and to supply an output to the primary winding of a second transformer having a secondary winding connected by means of rectifiers to a gate in the control input circuit of a controlled rectifier, the primary winding of said first transformer being arranged to receive the output of an oscillator.

The various features and advantages of the invention will be apparent from the following description taken with reference to the accompanying drawings wherein:

FIGURE 1 is a circuit diagram of one embodiment of the invention, and

FIGURE 2 is a circuit diagram of another embodiment.

Referring to FIGURE 1, the energy necessary to fire $n$ controlled rectifiers R is derived from a source of direct current 1. The continuous signal supplied by this source is converted into an alternating signal of rectangular waveform by a high frequency oscillator 2, the output of which is connected to the primary 3 of a transformer S having a secondary composed of $n$ identical windings 4. The ends of the secondaries 4 are connected to rectifying diodes D1 and D2, D3 and D4.

The positive rectified signal obtained at the output of diodes D1 and D2 is applied to the collector of a transistor T1, the emitter of which is connected, through a resistance $r$ to the control electrode of the corresponding controlled rectifier R.

The negative rectified signal obtained at the output of diodes D3 and D4 is applied, through a resistance $r'$, to the collector of a transistor T2, of opposite type to the first, the emitter of which is connected to the centre tapping of the $n$ secondaries 5 of a transformer S2, the primary 6 of which is fed by an auxiliary secondary 7 of the transformer S1, through a bi-directional gate composed of four diodes D10, D11, D12, D13 and a transistor Tr1. The output of the diodes D3 and D4 is connected to the base of the transistor T2 through a resistance $rb$. The base of the transistor Tr1 is connected to a conduction control or firing circuit CA of known type, through a resistance $r1$. The number of bi-directional gates controlled by one output of the firing circuit is not limited, neither is the number of outputs of the firing circuits. The firing circuit CA receives at its input terminals 8, 9 and 10, a continuous feed voltage, a synchronizing alternating voltage and a control voltage.

The secondary 5 of the transformer S2 is connected to the bases of transistors T1 and T2 through diodes D26 and D27.

The operation of the device according to the invention will now be described in detail with reference to the embodiment shown in FIGURE 1. The high frequency oscillator 2 passes the firing power through the secondaries 4 of the transformer S1, and multiplication of the firing orders through the secondary 7 of the transformer S1, to be obtained.

When the firing circuit CA sends out a pulse, the transistor Tr1 conducts, being subjected to a voltage between base and emitter limited by the resistance $r1$. The positive alteration across the secondary 7, takes the path D12, Tr1, D11 and arrives at the primary 6 of the transformer S2 whilst the negative alteration follows the path D10, Tr1, D13 and arrives at the primary of the transformer S2. The alternating signal of rectangular shape occurring at each secondary 5 is rectified by the diodes D26 and D27 and constitutes an instruction digital size "1." This instruction controls the gates of the grid circuits T1 and T2. The transistor T2 is non-conductive, the transistor T1 conducts and the corresponding controlled rectifier R is thus positively polarized.

When the transistor Tr1 is not subjected to a firing pulse from the firing circuit CA, it is non-conductive, the positive alterations are stopped by the diode D13 and the negative alterations are stopped by the diode D11. The transformer S2 is not fed and the output of diodes D26 and D27 represents an instruction of digital size "0," the transistor T2 conducts due to the pressure of the resistance $rb$. The controlled rectifier R is negatively polarised and thus made non-conductive.

The device according to FIGURE 1 allows, for example, firing of thirty-six controlled rectifiers R.

The device shown in FIGURE 2 is similar to that of FIGURE 1 and can be used, for example, for firing forty-eight controlled rectifiers R.

In this figure, two circuits, identical to that of FIGURE 1 are fed symmetrically by the firing circuit CA. The transistors Tr1 and Tr1' are reversed one with respect to the other.

In all cases there is amplification of the instruction coming from the firing circuit CA by the contribution of energy drawn from the oscillator 2.

It is possible, for example, with a single output from the firing circuit CA, to control eight transistor Tr1 bi-directional gates, each gate controlling, for example, thirty-six controlled rectifiers and each circuit CA having four outputs, and if the circuit is operated from three phase currents, to arrive, therefore, at a total of three thousand four hundred and sixty-six fixed controlled rectifiers.

An example of the application of the invention is to the equipment of a negative braking installation for a locomotive driven by four direct current motors in series pairs and fed by silicon rectifiers.

Regeneration is ensured through two Gratz bridges, each bridge being connected by two output terminals, to the armature of two motors in series, and by the two input terminals for the alternative feed.

Given the maximum possible current and voltage a large group of controlled rectifiers is arrived at for each Gratz bridges, for example, ninety-six per bridge, and a total of one hundred and ninety-two for the two bridges.

Each arm of the bridge comprises four identical rectifiers connected in series parallel, that is to say four paths of six rectifiers in series, connected in parallel. These rectifiers are controlled by a device identical to that of FIGURE 2.

In the example described above, the field windings of the locomotive motors are in series and connected to a controlled rectifier circuit composed of twelve elements controlled by the same device as that shown in FIGURE 2.

I claim:

1. A controlled rectifier conduction control arrangement comprising a source of conduction control signals, at least one bi-directional gate connected to said source, means connecting a secondary winding of a first transformer to an input of and feeding said gate, a second transformer having a primary winding and a plurality of secondary windings, a primary winding of a second transformer connected to said gate, means respectively connecting said secondary windings of said second transformer through rectifiers to a plurality of second gates, a control input circuit of a controlled rectifier including said second gate, a primary winding for said first transformer and an oscillator, means connecting said primary winding of said first transformer to the output of said oscillator.

2. An arrangement as described in claim 1, wherein said first transformer has a plurality of further secondary windings, each of said secondary windings has means connected to respective ones of said plurality of said second gates to a plurality of said control output circuits of said plurality of said controlled rectifiers.

References Cited

UNITED STATES PATENTS

| | | | |
|---|---|---|---|
| 3,095,513 | 6/1963 | LeZan | 307—88.5 |
| 3,193,725 | 7/1965 | Skirpan | 307—88.5 X |
| 3,248,634 | 4/1966 | Fudaley et al. | 307—88.5 X |

ARTHUR GAUSS, *Primary Examiner.*

JOHN S. HEYMAN, *Examiner.*